US 9,665,856 B1

(12) United States Patent
Guzzetta

(10) Patent No.: US 9,665,856 B1
(45) Date of Patent: May 30, 2017

(54) HAND-HELD ORDERING DEVICE AND SYSTEM

(75) Inventor: Alfred M. Guzzetta, Fort Myers, FL (US)

(73) Assignee: Fifon, Inc., Fort Myers, FL (US)

( * ) Notice: Subject to any disclaimer, the term of this patent is extended or adjusted under 35 U.S.C. 154(b) by 0 days.

(21) Appl. No.: 13/036,734

(22) Filed: Feb. 28, 2011

Related U.S. Application Data

(63) Continuation of application No. 11/834,948, filed on Aug. 7, 2007, now abandoned.

(60) Provisional application No. 60/822,293, filed on Aug. 14, 2006.

(51) Int. Cl.
| | |
|---|---|
| *G06Q 50/12* | (2012.01) |
| *G06Q 20/10* | (2012.01) |
| *G06Q 50/00* | (2012.01) |
| *G06Q 30/02* | (2012.01) |
| *G06Q 30/06* | (2012.01) |

(52) U.S. Cl.
CPC ........... *G06Q 20/10* (2013.01); *G06Q 20/102* (2013.01); *G06Q 30/0269* (2013.01); *G06Q 30/0633* (2013.01); *G06Q 50/01* (2013.01)

(58) Field of Classification Search
CPC .... G06Q 50/12; G06Q 30/0641; G06Q 30/06; G06Q 30/0633; G06Q 30/0635
USPC .......................................................... 705/15
See application file for complete search history.

(56) References Cited

U.S. PATENT DOCUMENTS

| | | | |
|---|---|---|---|
| 6,842,719 B1 * | 1/2005 | Fitzpatrick et al. .......... 702/182 |
| 2002/0143638 A1 * | 10/2002 | August ................. G06Q 20/12 |
| | | | 705/14.27 |
| 2002/0143655 A1 * | 10/2002 | Elston et al. .................... 705/26 |
| 2002/0194061 A1 * | 12/2002 | Himmel et al. ................ 705/14 |
| 2003/0208409 A1 * | 11/2003 | Mault ............................. 705/26 |
| 2004/0243430 A1 * | 12/2004 | Horstemeyer .................... 705/1 |
| 2006/0178932 A1 * | 8/2006 | Lang ............................... 705/14 |
| 2006/0255128 A1 * | 11/2006 | Johnson et al. ............... 235/380 |
| 2007/0077944 A1 * | 4/2007 | Bellenger et al. ......... 455/456.1 |
| 2007/0088624 A1 * | 4/2007 | Vaughn et al. ................. 705/26 |

OTHER PUBLICATIONS

Lloyd, Susan M. Consumers' experiences with e-commerce technologies: Three essays. University of Illinois at Urbana—Champaign, ProQuest Dissertations Publishing, 2002. 3070026.*

* cited by examiner

*Primary Examiner* — Ryan Zeender
*Assistant Examiner* — Fawaad Haider
(74) *Attorney, Agent, or Firm* — Woods Oviatt Gilman LLP; Katherine H. McGuire, Esq.

(57) ABSTRACT

A hand-held ordering device and system which allows a user to order a meal at a restaurant or place an order at any business using a wireless transmission means.

4 Claims, 6 Drawing Sheets

HAND-HELD ORDERING DEVICE AND SYSTEM

BACKGROUND

This application is a continuation of U.S. application Ser. No. 11/834,948 filed on Aug. 7, 2007, which claims the benefit of U.S. Provisional Application Ser. No. 60/822,293 filed on Aug. 14, 2006, both of which are incorporated by reference in their entireties.

SUMMARY

The present invention relates to a hand-held device and a system for wirelessly transmitting an order to a restaurant or other business. One purpose of this device is to allow restaurants to have increased lead-time in which to process and prepare orders in an attempt to eliminate wait time and serve the maximum number of customers. The device may also serve as an advertising tool and, may have audio and visual display capabilities. Potential users include individuals, families, sports teams, office groups, tour groups, or other groups of people who want to order food on the go.

DETAILED DESCRIPTION

Figure 1:
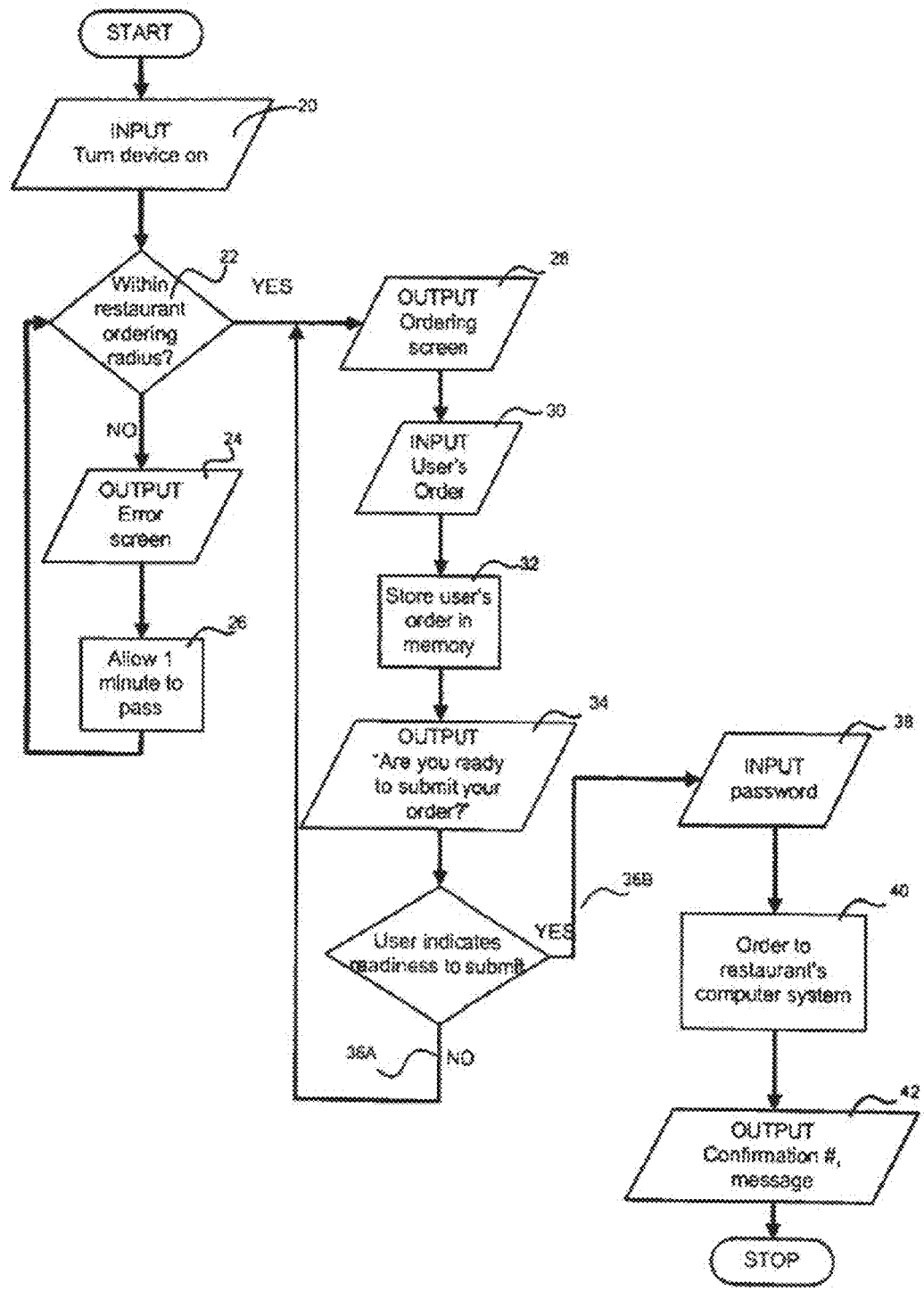
FIG. 1 is a flowchart showing the basic operation of an embodiment of the device designed for a single restaurant chain.

FIG. 1 is a flowchart which shows a basic outline of the use of one embodiment of a device made in accordance with the present invention. In this embodiment, the device is a dedicated device that is provided to a consumer by a particular restaurant or store and can only be used with that particular restaurant or store. The device is handheld, has a screen for video (graphics, text, or animation) and a speaker for audio output as well as buttons for inputting. Alternative devices could have touch screens or microphones as other methods of input. (Obviously, other embodiments could have any combination of such elements without departing from the scope of the invention.) The device also has a radio transmitter and receiver.

In order to use the device, it first is activated as shown at 20. At any point after it has been activated, the device may be used for visual and/or audio advertising. This advertising material may come pre-programmed in the device, or it may be sent to the device via radio transmission. Alternatively, a combination of the two may be used; the device can come with a preprogrammed base of graphics and text, and updates can be sent to it periodically via radio transmission. For example, in the morning hours, the device could show advertisements for breakfast specials which could change to advertisements for lunch specials around lunchtime, either automatically as per programmed directions, or at the command of a radio signal.

This embodiment of the device contains both a lithium battery and a standard alkaline battery. The lithium battery powers the memory of the device (which should be preserved even when the device is off), and the standard alkaline battery powers the device when it is turned on. Of course, it will be obvious to those skilled in the art to use any suitable known power source.

Since this particular device works with only one restaurant, the user does not need to select the desired restaurant. (Other embodiments may require the user to select the desired chain of restaurants, or the desired restaurant within, a chain, as will be described later.) Once the user activates the device as shown at 20, the device verifies that it is within the desired range of its selected restaurant as shown at 22. This range may be programmed or changed depending on the individual desires of the restaurant or the user, but, preferably, it should be between one-half and five miles away or whatever distance will-offer the desired lead-time to the restaurant.

The device may determine its distance from the restaurant via one, or more of several methods. For example, the device may access a Global Positioning System to determine its latitude and longitude coordinates, and then compare those coordinates to those of the restaurant to determine its distance. Alternatively, it may triangulate its location by determining its signal strength to various transmission towers.

If the device is not within this range, then it will output an error screen 24 with some sort of appropriate message such as "out of range." It may also make some sort of appropriate sound to notify the user that it is out of range and an order cannot be submitted. The device would then allow some set time interval to pass—in this embodiment, one minute as shown at 26—before again checking its location and range.

Once the device is within range of the restaurant, it will continue with the next step of the ordering system, presenting an ordering screen 28 to the user. Alternatively, the device could store orders before coming into range of restaurant, and then transmit the orders once the restaurant is within range.

The information on the ordering screen 28 could be transmitted to the device upon activation or could be stored in the memory of the device and periodically updated. This screen could be text-based but would preferably be mainly graphics-based. Images of the menu of the restaurant are displayed, and the user selects his order using a touch screen, stylus, mouse, keyboard, or other known means of selection. The user may customize his order, as well. For example, if the user selects a hamburger, he may then see another screen image giving him options such as what condiments he would like. For example, he could choose to include lettuce, onions, pickles, and mayonnaise, but no mustard or tomato slices. As the user makes these selections at 30, the device will acknowledge them, and may even show an appropriate animation. For example, as the user asks for lettuce on his hamburger, small cartoon lettuce leaves could fly into a cartoon hamburger on the screen. Because the user inputs all this information himself and can easily view, verify, and edit it, the device can be much more accurate than traditional oral ordering methods. This is especially important with large groups of people; a bus full of members of a tour group could pass the device around and all input their individual order accurately. All of the user's selections are stored in the working memory of the device as shown at 32. After the user makes his selection, the device outputs a question as shown at 34 to ensure that the user is finished making selections and is ready to transmit his order to the restaurant. If the user indicates that he is not ready as shown at 36A, the device 6 returns to the ordering screen for further input or editing. If, on the other hand, the user indicates that he has completed his order and is prepared to send it as shown at 36B, the system continues.

At this point, for security reasons, the user may be required to enter a security code or password as shown at 38. The user may pay by credit card or some other method as the order is sent to the restaurant's computer system as shown at 40, or he may pay at the restaurant when the order is delivered.

Once the restaurant has received the order, it sends a confirmation number and corresponding message to the device as shown at 42, which displays both on the screen. This concludes the basic process of using the dedicated device. At this point, the user travels to the restaurant to pick up his completed order. The device also may direct the user to the restaurant with audio and/or visual directions.

While this embodiment envisions transmitting the order to the restaurant via radio waves, using cell phone technology, another mechanism for transmitting the order would be via infrared transmission. In this case, the order could simply be stored in the device, and then the user could drive-up to a kiosk remote from the restaurant or at the restaurant itself, with the kiosk adapted to receive an infrared transmission, and transmit the order via infrared to that kiosk. The kiosk would be equipped with means to transmit to the restaurant by some known means, such as being hard-wired, by telephone lines, by radio transmission, and so forth. Of course, any known methods of transmitting electronic signals could be used for transmission of the order between the hand-held device and the kiosk and/or restaurant.

Figure 2:
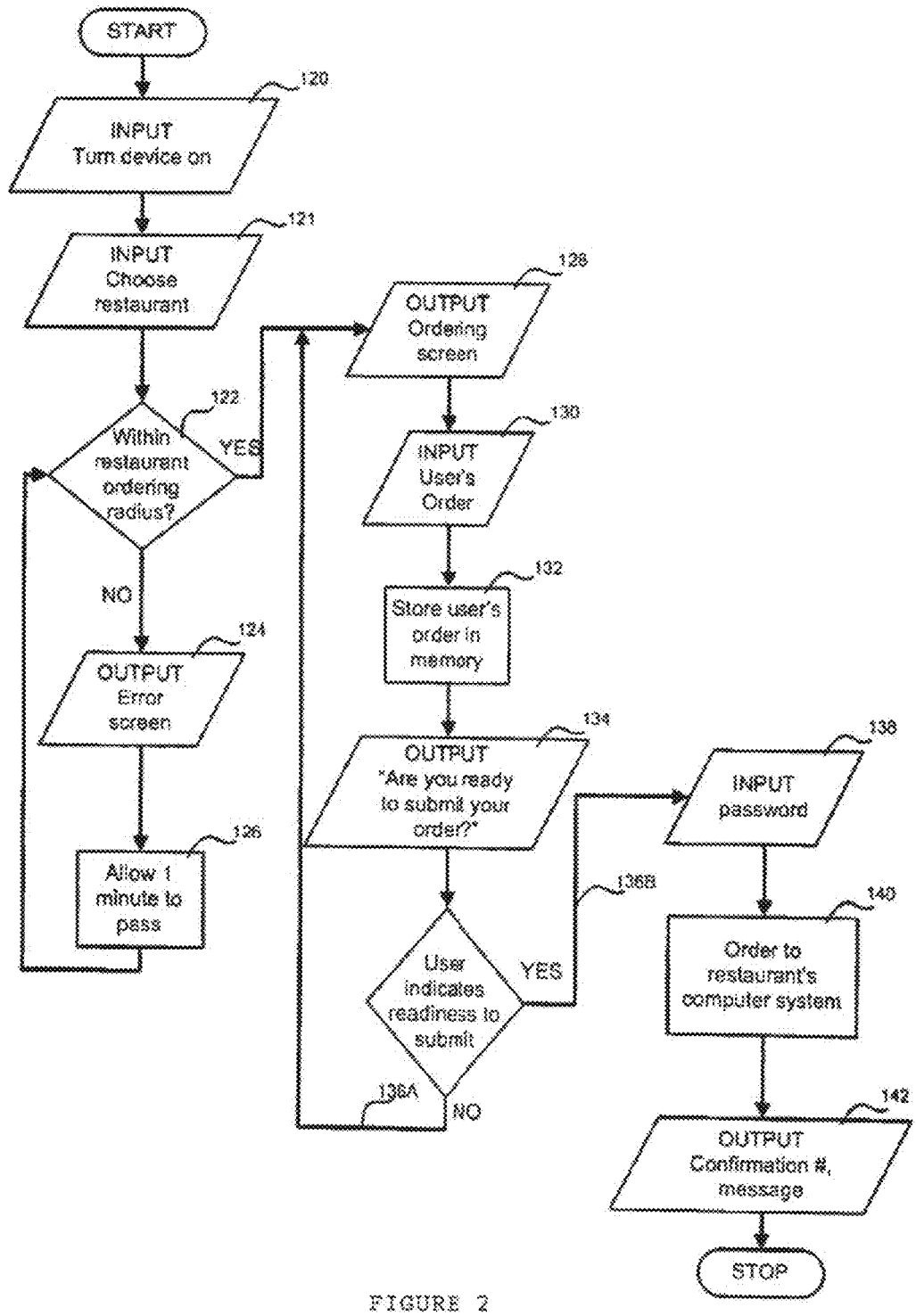
FIG. 2 is a flowchart showing the basic operation of an embodiment of the device for multiple restaurant chains.

FIG. 2 is a flowchart which shows a basic outline of the use of another embodiment of the device. This device is similar to the previous embodiment in nearly all respects, but it is not dedicated to a single restaurant or other business. Instead, it operates with several different restaurants or businesses. Thus, after activating the device as shown at 120, the user must choose the restaurant chain from which he wishes to order, and, possibly (given the number of restaurants of that chain in the area) which specific branch of that chain. This selection is shown at 121. In order to select the desired chain or branch, the user will be presented with a selection screen showing him his various options, or allowing him to browse or search for a desired restaurant based on a variety of criteria. This information could be stored in the local memory of the device, or transmitted via radio signal. The device may also have access to data about the locations of the nearest restaurants, and may suggest a restaurant based on which is closest to the user or to a location that is entered by the user. Upon user selection, the device may then offer video and/or audio directions to help the user navigate to the selected restaurant. This information could be transmitted via satellite or cellular telephone towers, and could be tied to a Global Positioning System. Such a feature could be very useful for travelers; they could locate a restaurant, order, and be navigated to the restaurant, all with the same device.

Figure 3:
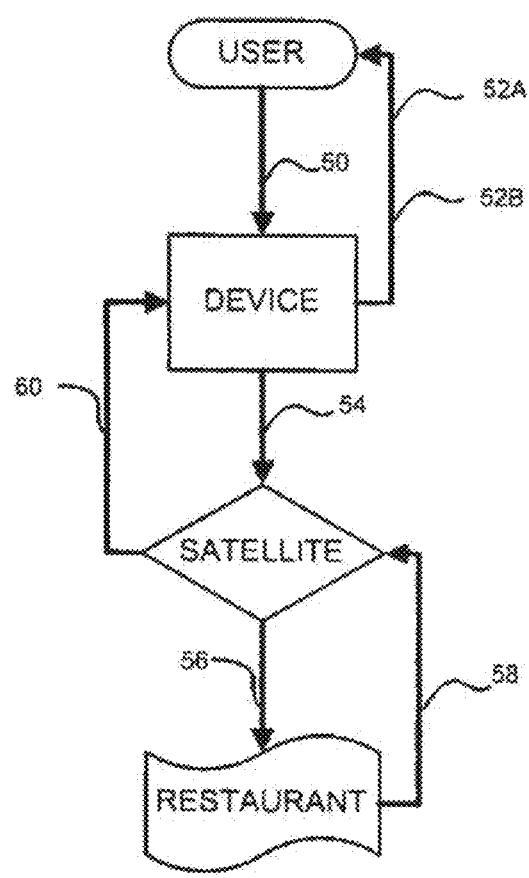
FIG. 3 is a flowchart showing an embodiment of the system flow using a satellite.

FIG. 3 is a flowchart which shows the transmission of data throughout the ordering process. This embodiment of the system uses satellites to direct the radio signals which transmit the data. First, the user inputs restaurant and order information into the device as shown at 50. The device temporarily stores this information for editing, and may at any point, send information in the form of advertising back to the user as shown at 52A. Once the user is ready, the device sends the order information via satellite as shown at 54. This satellite directs the information to the receiver at the restaurant as shown at 56, wherein this data may be incorporated directly into the assembly line (human or fully-automated), and the order placed in a queue for filling. The system may also be optimized to determine the best location to put the order in the queue based on how long it takes to complete that type of order, and on the general location of the user. This location may be determined by the device via several methods as previously described, and transmitted to the restaurant's system with the order data. Such optimization would prevent food from being prepared too early or too late. Once the order is received, the restaurant's system may assign it an order number (or confirmation number) or other verifying message, and send this data back via the satellite (shown at 58) to the device (shown at 60) which displays it for the user as shown at 52B.

Figure 4:
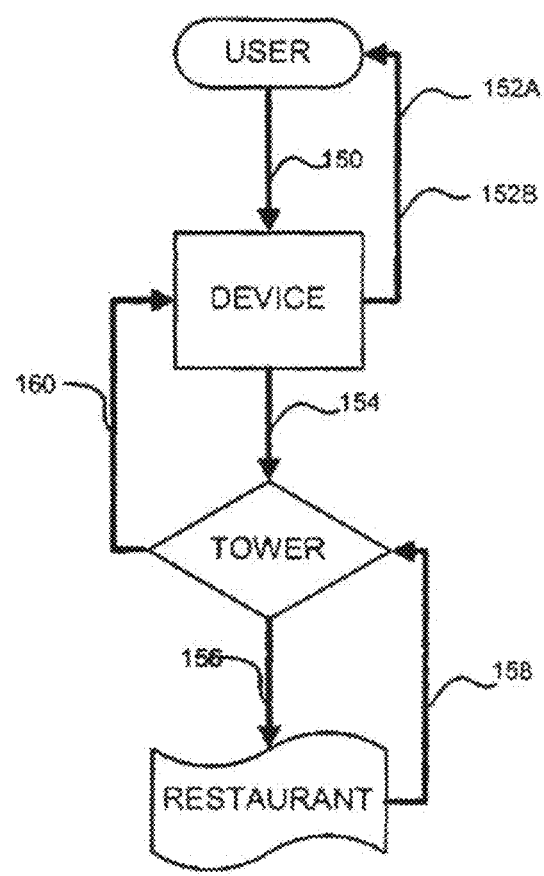
FIG. 4 is a flowchart showing an embodiment of the basic system flow using a tower.

As the flowchart of FIG. 4 shows, however, other methods of data transmission may be used besides a satellite. As is the current standard for cellular telephones, a network of transmission towers could also be used with the device and system, taking the place of the satellite in the system of FIG. 3.

Figure 5:
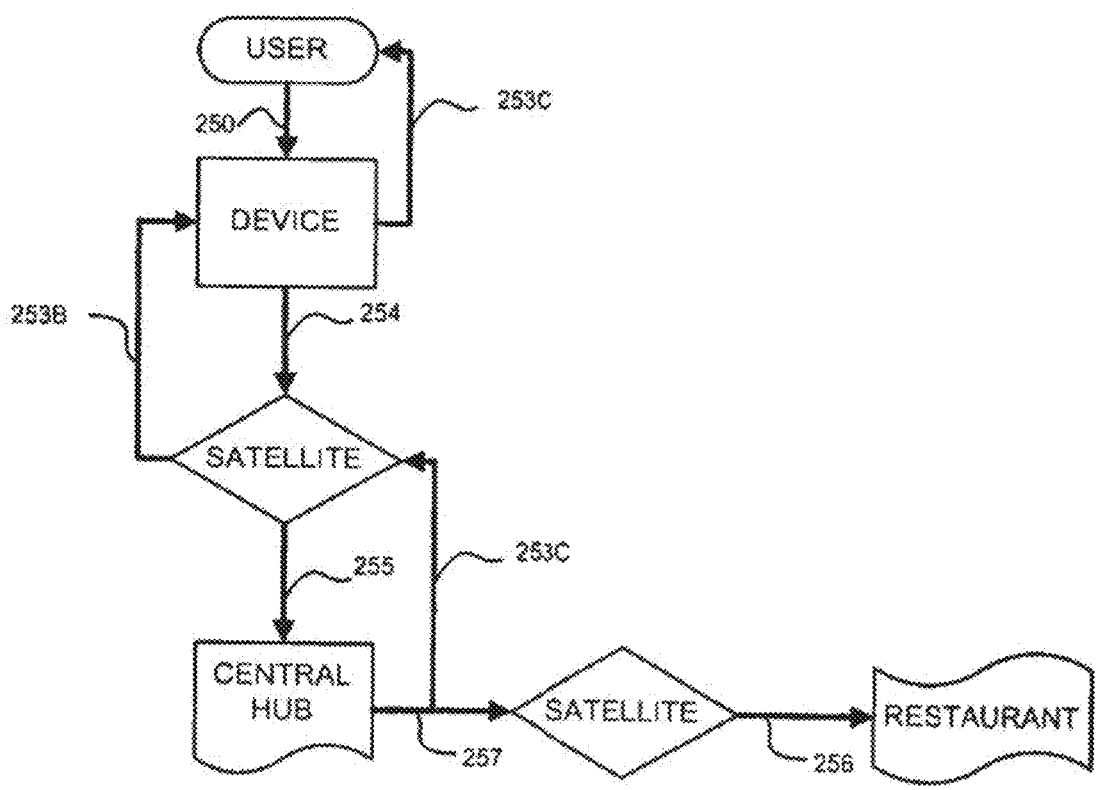
FIG. 5 is a flowchart showing an embodiment of the system flow through a central control station to a single restaurant.

FIG. 5 is a flowchart which shows another embodiment of the system. This embodiment of the system would be used in a situation where the device works with a number of restaurants. In this case, the system is organized through a central hub rather than going directly to the restaurant. In this system, the user again begins by inputting the restaurant information, order, and payment information or password into the device as shown at 250, which then sends the information via satellite or other sending means, such as a tower to a central hub as shown at 254 and 255, respectively. The central hub then sends the information and customer payment via satellite or tower (257) (in some cases the same satellite or tower may be used) or some other transmission means to the appropriate restaurant (as shown at 256), where it is accepted into the restaurant's ordering system as in the previous embodiments. In this system, the central hub sends confirmation messages back to the device and user as shown at 253A, 253B, and 253C, though the restaurant could do this as well.

Figure 6:
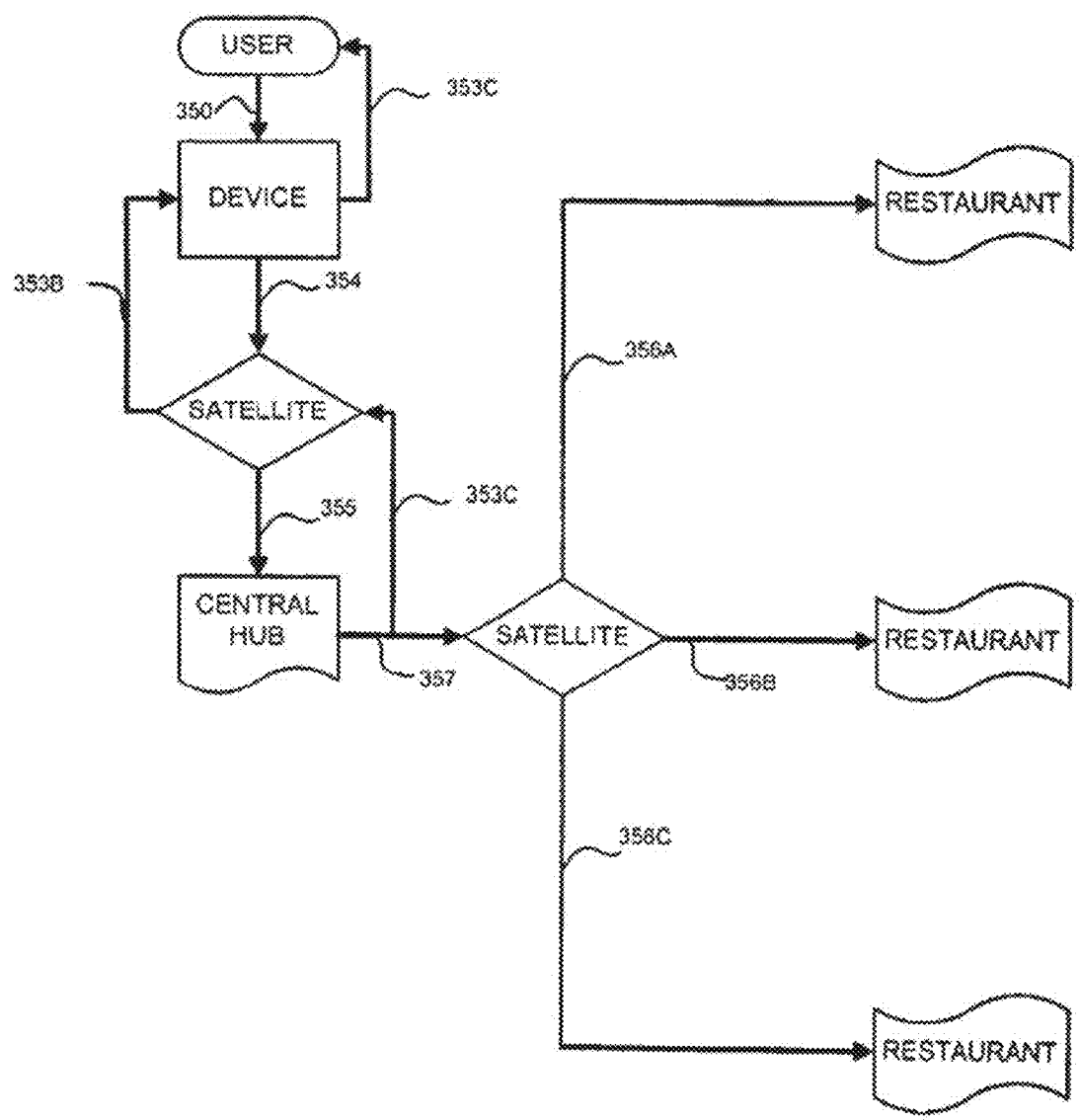
FIG. 6 is a flowchart showing an embodiment of the system flow through a central control station to multiple restaurants.

This system could also work with ordering from multiple restaurants, as is shown in the flowchart of FIG. 6. For example, the user may order a meal from one restaurant, a beverage from another restaurant, and a dessert from a third restaurant. The system begins when the user inputs the appropriate order and payment information into the device as shown at 350. The device then transmits the data wirelessly via one or more satellites or other transmission means to the central hub as shown at 354 and 355, respectively. The central hub then sorts the order into the three sub-orders, and transmits them via one or more satellites (357) or other transmission means to the various restaurants as shown at 356A, 256B, and 356C. From there, the system continues as it has in previous embodiments; the central hub or the restaurants could transmit a confirmation number of message to the user as shown at 353A, 353B, and 353C, and the user need only go to the various restaurants to retrieve his order. As in the other embodiments, this system allows the device to be used as an effective advertising tool. The restaurants could communicate through the central hub to have the device output visual or audio data to the user about menus, specials, locations, directions, pricing, or other relevant information. Alternatively, such information could be preprogrammed into the device.

This device and system would be applicable in many different settings, including bagel shops, coffee shops, tea shops, donut shops, fast food restaurants, delis, restaurants, ice cream parlors, etc., and may even be used in other applications outside the food industry.

What is claimed is:

1. A method for placing an order at a chosen one of a plurality of restaurants with a wireless device, the restaurants remote from the wireless device, the wireless device comprising:

a video display;
an input device;
a wireless transceiver;
a location detector to detect a location of the wireless device that is remote from the chosen restaurant; and
a processor communicatively coupled to the location detector, the video display, the wireless transceiver, and the input device, the processor to:
  determine a respective set of distances between the location of the wireless device and each of the plurality of restaurants;
use the set of distances to identify which of the plurality of restaurants are within a predetermined distance of the location;
  cause the video display to display a list comprising only those restaurants that are within the predetermined distance of the location;
cause a menu of the restaurant chosen at the input device to be displayed on the video display;
  accept an order entered at the input device;
  cause the wireless transceiver to communicate the order and automatically provide the location of the wireless device to the chosen restaurant only when the location of the wireless device is within a predetermined distance of the restaurant; and
cause the video display and/or wireless transceiver to provide video and/or audio navigation directions to direct the wireless device to the chosen restaurant,
wherein the processor is to use the location to automatically calculate an estimated time of arrival of the wireless device at the restaurant and wherein the processor is to communicate the estimated time of arrival to the restaurant such that the order is placed into a queue at the restaurant based on the location of the wireless device to cause said order to be ready at or about said estimated time of arrival, the method comprising the steps of:
a) activating the input device to generate a list of a plurality of restaurants which are remote from and within a predetermined distance of the wireless device;
b) displaying on the video display the list of the plurality of restaurants;
c) generating a prompt for a selection of at least one of the restaurants from the list of the plurality of restaurants;
d) selecting at the input device one of the plurality of restaurants causing the processor to display the menu of the chosen restaurant on the video display;
e) selecting at the input device an order of food chosen from the displayed menu;
f) determining a location of the wireless device that is remote from the chosen restaurant using the location detector of the wireless device;
g) communicating the order and automatically providing the location of the wireless device to a communication system associated with the chosen restaurant using the wireless transceiver of the wireless device;
h) communicating navigation directions directing the wireless device to the chosen restaurant;
i) automatically calculating and communicating an estimated time of arrival at the chosen restaurant; and
j) placing the order into a queue at the restaurant based on the location of the wireless device to cause said order to be ready at or about said estimated time of arrival at the chosen restaurant.

2. The method of claim 1, wherein the processor is to cause the video display to display a notification when the location of the wireless device is not within a predetermined distance of the chosen restaurant.

3. The method of claim 1, wherein the processor is to accept the order entered at the input device only when the location of the wireless device is within a predetermined distance of the chosen restaurant.

4. The method of claim 1, further comprising displaying a notification on the video display when the location of the wireless device is not within a predetermined distance of the restaurant.

* * * * *